United States Patent
Oh et al.

(10) Patent No.: US 8,022,949 B2
(45) Date of Patent: Sep. 20, 2011

(54) SYSTEM AND METHOD FOR GENERATING CURVATURE ADAPTED ISOSURFACE BASED ON DELAUNAY TRIANGULATION

(75) Inventors: Seungtaik Oh, Gyeonggi-do (KR); Bon Ki Koo, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 927 days.

(21) Appl. No.: 11/950,312

(22) Filed: Dec. 4, 2007

(65) Prior Publication Data

US 2008/0129727 A1 Jun. 5, 2008

(30) Foreign Application Priority Data

Dec. 4, 2006 (KR) .......................... 10-2006-0121381
Sep. 28, 2007 (KR) .......................... 10-2007-0098052

(51) Int. Cl.
*G06T 15/00* (2011.01)
(52) U.S. Cl. ........ 345/423; 345/418; 345/419; 345/428; 703/2; 703/10
(58) Field of Classification Search .................. 345/418, 345/419, 423, 428; 703/2, 10
See application file for complete search history.

(56) References Cited

U.S. PATENT DOCUMENTS

| | | | |
|---|---|---|---|
| 5,886,702 A * | 3/1999 | Migdal et al. ................. | 345/423 |
| 6,262,739 B1 * | 7/2001 | Migdal et al. ................. | 345/423 |
| 6,266,062 B1 * | 7/2001 | Rivara ............................ | 345/419 |
| 6,611,267 B2 * | 8/2003 | Migdal et al. ................. | 345/428 |
| 7,590,512 B2 * | 9/2009 | Shimada et al. .................. | 703/2 |
| 7,634,395 B2 * | 12/2009 | Flandrin et al. ................. | 703/10 |
| 7,825,927 B2 * | 11/2010 | Kim et al. ...................... | 345/419 |
| 2002/0171643 A1 | 11/2002 | Ernst et al. | |

OTHER PUBLICATIONS

Golias et al, Delaunay Triangulation and 3D Adaptive mesh Generation, Finite Element in Analysis and Design 25, pp. 331-341, 1997.*
R. Westermann et al., "Real-time exploration of regular volume data by adaptive reconstruction of isosurfaces", The Visual Computer, 15, pp. 100-111, 1999.

* cited by examiner

*Primary Examiner* — Phu Nguyen
(74) *Attorney, Agent, or Firm* — Rabin & Berdo, P.C.

(57) ABSTRACT

Provided are a system and method for extracting a curvature adapted mesh from a three dimensional implicit function data. The system includes an initial mesh generation module, a curvature geometry module, a space division module, and a final mesh extraction module. The initial mesh generation module generates an initial mesh by receiving implicit function data. The curvature geometry module receives the initial mesh from the initial mesh generation module, calculates a directional curvature of a curved surface, generates a Delaunay vertex set used for Delaunay triangulation, and recalculates an implicit function. The space division module generates Delaunay triangulation information by performing Delaunay triangulation based on the generated Delaunay vertex set from the curvature geometry module, and the final mesh extraction module receives the generated Delaunay triangulation information from the space division module and the three dimensional implicit function data updated at the curvature geometry module, and extracts a final mesh the received three dimensional implicit function data.

7 Claims, 4 Drawing Sheets

SYSTEM AND METHOD FOR GENERATING CURVATURE ADAPTED ISOSURFACE BASED ON DELAUNAY TRIANGULATION

BACKGROUND OF THE INVENTION

1. Field of the Invention

The present invention relates to a system and method for extracting a curvature adapted mesh from a three dimensional implicit function data, and more particularly, to a method for generating a curvature adapted isosurface based on Delaunay triangulation, which extracts an initial mesh from an initial three dimensional implicit function data, calculates the directional curvature of a curved surface from the extracted mesh, calculates a set of Delaunay vertexes using the calculated directional curvature for Delaunay space-division, and calculates data for Delaunay triangulation and three dimensional implicit function from the calculated set of the vertexes again.

2. Description of the Related Art

In general, a conventional method of extracting an isosurface by uniformly dividing a space was widely used as a method for visualizing three-dimensional implicit function data or volume data. However, the conventional method of extracting an isosurface had an inefficiency problem. That is, some of areas could not be finely expressed because the uniform resolution was used, and many triangles were used unnecessarily even in a non-detailed area. Particularly, the loss of the detailed parts of a curved space may cause serious problems in a medical imaging, physics simulation, and high quality rendering, which require super high precision. In order to overcome such problems, there have been many studies for developing a method for extracting an isosurface by non-uniformly dividing a space.

Accordingly, a method for obtaining an isosurface by finely dividing a space in a form of an octree was introduced in an article by M. Ohlberger and M. Rumpf, entitled "Hierarchical and adaptive visualization on nested grids" in Computing, 59(4) 269-285, 1997, and another article by Shekhar, Fayyad, Yagel and Cornhill, entitled "Octree based decimation marching cubes surfaces" in Visualizaition'96 335-342. Although the octree based isosurface obtaining method has an advantage of controlling a resolution, it fails to overcome the problems of too many triangles, the cracks between cells having different resolutions, and the connection of T shaped triangles having vertexes at edges thereof. The problems of the octree based isosurface obtaining method were introduced in an article by Bey, entitled "Tetrahedral grid refinement" in Computing, 55(4) 355-378.

Such problems may be solved by dividing a space in a shape of a tetrahedron rather the shape of the octree. If the space is divided in the shape of the tetrahedron, the crack problem does not arise, and the resolutions can be freely controlled while changing the size and the shape of the tetrahedron.

Therefore, there is a demand for developing a method and system for dividing a space in a shape of a tetrahedron and generating a curvature adapted isosurface using the same.

SUMMARY OF THE INVENTION

Accordingly, the present invention is directed to a system and method for extracting a curvature adapted isosurface based on Delaunay triangulation, which substantially obviates one or more problems due to limitations and disadvantages of the related art.

It is an object of the present invention to provide a system and method for fully reflecting the curvature of a curved space by effectively generating a set of Delaunay vertexes (vertices) for tetrahedron division and optimizing the number of triangles in a curvature mesh.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a system for generating a curvature adapted isosurface based on Delaunay triangulation including: an initial mesh generation module for generating an initial mesh by receiving implicit function data; a curvature geometry module for receiving the initial mesh from the initial mesh generation module, calculating a directional curvature of a curved surface, generating a Delaunay vertex set used for Delaunay triangulation, and recalculating an implicit function; a space division module for generating Delaunay triangulation information by performing Delaunay triangulation based on the generated Delaunay Vertex set from the curvature geometry module; and a final mesh extraction module for receiving the generated Delaunay triangulation information from the space division module and the three dimensional implicit function data updated at the curvature geometry module, and extracting a final mesh the received three dimensional implicit function data.

In accordance with another purpose of the invention, there is provided a method for generating a curvature adapted isosurface based on Delaunay triangulation including the steps of: a) at an initial mesh generation module, generating an initial mesh by receiving three dimensional implicit function data; b) at a curvature geometry module, receiving the initial mesh from the initial mesh generation module, calculating a directional curvature of a curved surface and locations of Delaunay vertex sets, and updating implicit function data for each of the Delaunay vertex sets; c) at a space division module, receiving the calculated Delaunay vertex sets transferred from the curvature geometry module, and generating Delaunay triangulation information of a smallest convex space having vertexes through Delaunay tetrahedron division algorithm using a Delaunay vertex; and d) at a final mesh extraction module, receiving the generated Delaunay triangulation information from the space division module, and generating a curvature adapted curved space mesh by applying a tetrahedron adapted isosurface extraction algorithm on the received Delaunay triangulation information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
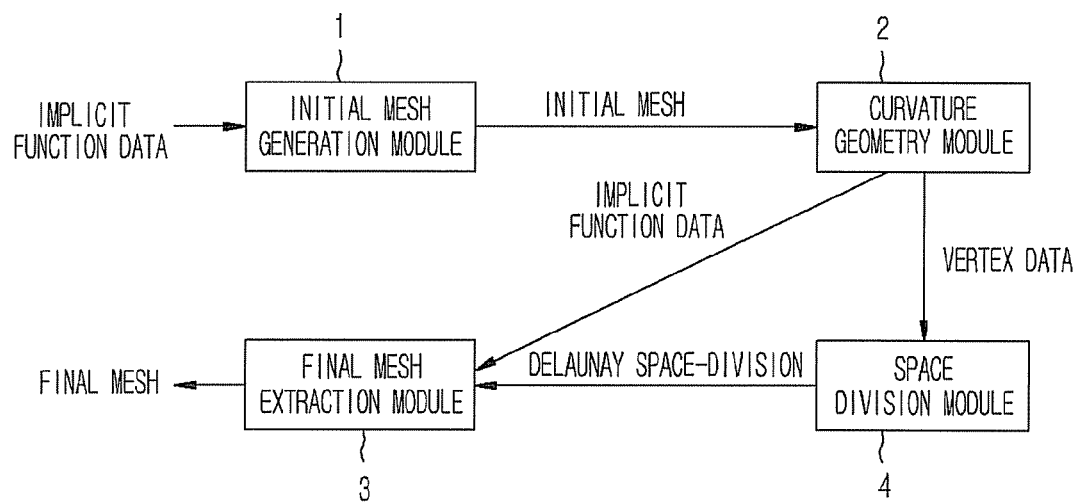
FIG. 1 is a block diagram illustrating a system for generating a curvature adapted isosurface from three dimensional implicit function data according to an embodiment of the present invention.
Figure 2:
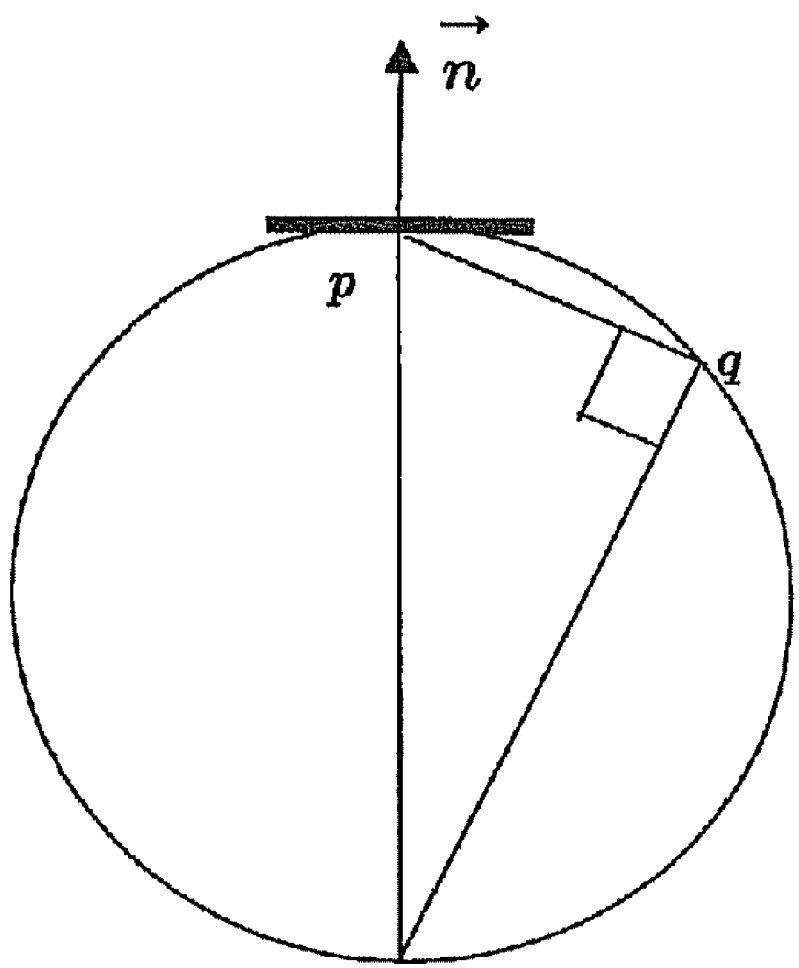
FIG. 2 is a geometric diagram illustrating the calculation of directional curvature in a curvature geometric module of FIG. 1 according to an embodiment of the present invention.
Figure 3A:
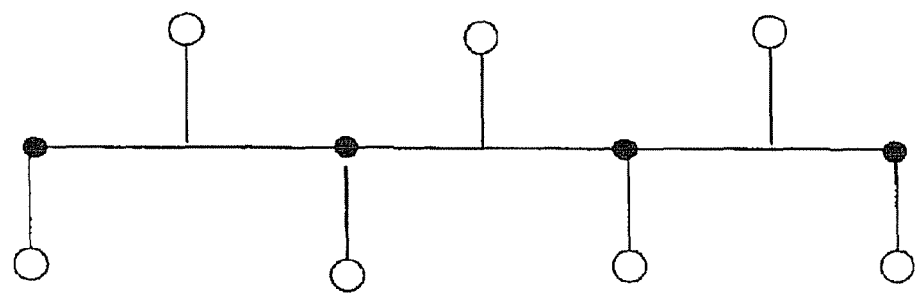
FIG. 3A through FIG. 3C are diagram illustrating the arrangement of Delaunay vertexes along mesh vertexes in a curvature geometric module of FIG. 1 according to an embodiment of the present invention.
Figure 3B:
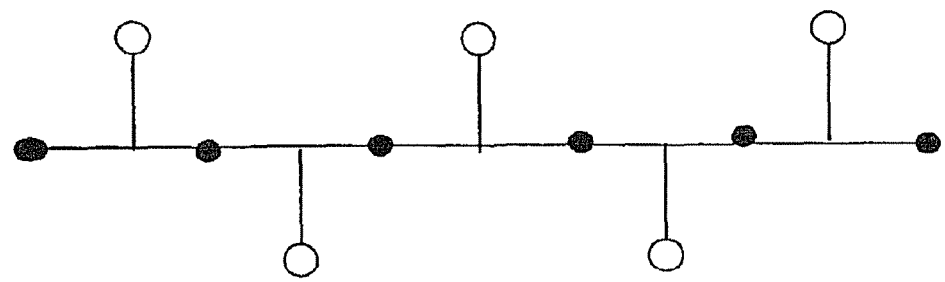
Figure 3C:
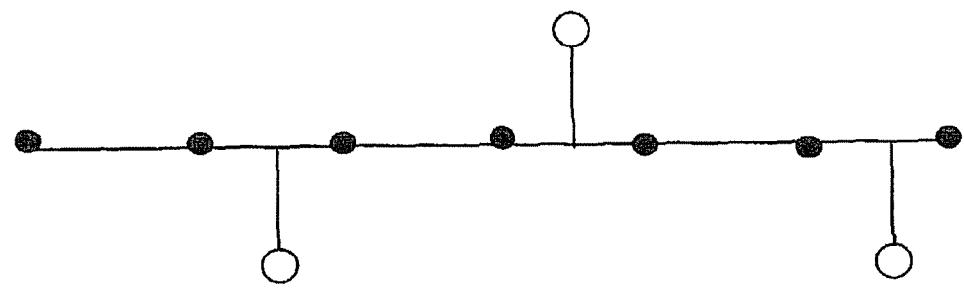

FIG. 1 is a block diagram illustrating a system for generating a curvature adapted isosurface from three dimensional implicit function data according to an embodiment of the present invention, and FIG. 2 is a geometric diagram illustrating the calculation of directional curvature in a curvature geometric module of FIG. 1 according to an embodiment of the present invention. FIG. 3A through FIG. 3C are diagram illustrating the arrangement of Delaunay vertexes along mesh vertexes in a curvature geometric module of FIG. 1 according to an embodiment of the present invention.

Referring to FIG. 1 through FIG. 3C, the system for generating a curvature adapted isosurface from three dimensional implicit function data according to the present embodiment includes an initial mesh generation module 1 for receiving three dimensional implicit function data and generating an initial mesh from the received three dimensional implicit function data, a curvature geometry module 2 for receiving the initial mesh from the initial mesh generation module 1, calculating a directional curvature of a curved surface, generating a Delaunay vertex set used for Delaunay triangulation, and recalculating an implicit function, a space division module 4 for generating Delaunay triangulation information by performing Delaunay triangulation based on the generated Delaunay Vertex set from the curvature geometry module 2, and a final mesh extraction module 3 for receiving the generated Delaunay triangulation information from the space division module 4 and the three dimensional implicit function data updated at the curvature geometry module, and extracting a final mesh from the received three dimensional implicit function data.

The initial mesh generation module 1 receives the three dimensional implicit function data as input and quickly generates an initial mesh from a medium and low resolution uniform grid. Herein, a corresponding resolution is decided in consideration of the resolution of the input implicit function. The generated initial mesh is used to calculate diverse geometrical information of a curved surface, such as normal vector or directional curvature.

The curvature geometry module 2 is a major element in the system according to the present embodiment. The curvature geometry module 2 receives the generated initial mesh from the initial mesh generation module 1 as input data and outputs the Delaunay vertex set to be used for Delaunay triangulation as output data.

Referring to FIG. 2, it is required to calculate a directional curvature from an edge formed by two vertexes (p, q) of the initial mesh in order to output the Delaunay vertex set for space division. The directional curvature may be calculated by various methods. In the present embodiment, the directional curvature is calculated by calculating a normal vector from vertexes and calculating an average of directional curvatures from vertexes at both ends of a given edge. The direction of a normal vector is calculated from vertexes basically based on a normal vector calculating method introduced in an article by Meyer, Desbrun, and Schroeder, entitled "Discrete differential geometry operators in triangulated 2-manifolds", in VisMath, Berlin, 2002. If the mean curvature of the surface at a vertex is 0, that is, if the direction of a normal vector is not decided, the direction of the normal vector is decided based on the predetermined weighted sum of the directions of normal vectors of peripheral triangles. The directional curvature k of an edge connected with vertexes is calculated by calculating a normal vector of one vertex and a circle decided by the other vertex of an edge and calculating the reciprocal of a radius of the calculated circle, as expressed in Eq. 1.

$$k = \frac{1}{R} = \frac{\|\vec{v}\|^2}{2\vec{n}\cdot\vec{v}} \qquad \text{Eq. 1}$$

In Eq. 1, p and q denote vertexes at both ends of an edge, $\vec{v} = q - p$, $\vec{n}$ is an outward normal vector for the vertexes p and q. Meanwhile, the final directional curvature k is decided by calculating an average of directional curvatures for all edges because it is possible to the outward normal vectors can be identically calculated for vertexes of all other edges.

Edges are classified into three sets based on the calculated directional curvatures from edges of a curved surface. In order to classify, two values are selected between the minimum directional curvature and the maximum directional curvature. For the convenience, the selected two values are defined as a large value and a small value. All of the edges of a mesh can be classified into a set having directional curvatures between the large value and the small value, a set having directional curvatures smaller than the small value, and a set having directional curvatures larger than the large value. Then, a predetermined process is performed to lump connectable edges in each set together. Then, entire set of edges can be classified into a plurality of lumps of small unit edges based on the directional curvatures and the topology of a curved surface.

Referring to FIG. 3A through 3C, Delaunay vertex and mesh vertex, which are generated in the curvature geometry module for Delaunay triangulation, will be described. In the drawings, black dots denote mesh vertexes, and white dots denote Delaunay vertexes. Basically, if vertexes are arranged in a positive direction of a normal vector, adjacent vertexes are arranged in a negative direction of a normal vector to cross.

FIG. 3A shows Delaunay vertexes and mesh vertexes in case of a set having large directional curvatures. In case of the set having large directional curvature, a Delaunay vertex is arranged at a predetermined distance from the center of an edge in a positive direction of a normal vector, and Delaunay vertexes are arranged at a predetermined distance from the mesh vertexes, which are both ends of the edge, in the negative direction of the normal vector.

FIG. 3C shows Delaunay vertexes and mesh vertexes in case of a set having small directional curvatures. In this case, if a Delaunay vertex is arranged at a predetermined distance in the positive direction or the negative direction of a normal vector from the center of an edge, vertexes are not arranged at the adjacent edges. Then, a Delaunay vertex is arranged in the positive direction or the negative direction of a normal vector at a predetermined distance from the center of an edge adjacent to an edge with not Delaunay vertex arranged. For example, if a Delaunay vertex is arranged at a predetermined distance from the center of an edge in a positive direction of a normal vector, no Delaunay vertex is arranged at adjacent edge. Then, Delaunay vertex is arranged at a predetermined distance from the center of an edge, which is two-edges separated from the edge with the Delaunay vertex, in a negative direction of a normal vector.

FIG. 3B shows Delaunay vertexes arranged in case of a set having intermediate directional curvatures, which is an intermediate type of FIG. 3A and FIG. 3C. As shown in FIG. 3B, a Delaunay vertex is arranged at a predetermined distance from the center of an edge in a positive direction or a negative direction of a normal vector in a set of edges having the intermediate directional curvature, and another Delaunay vertex is arranged at a predetermined distance from the center of adjacent edge in a negative direction or a positive direction of a normal vector.

As described above, Delaunay vertexes can be arranged while controlling the number of Delaunay vertexes in proportion to directional curvatures, and the Delaunay vertexes are arranged alternatively in the positive direction and the negative direction from an edge at the uniform interval. In this case, more Delaunay vertexes are arranged at an area having large curvature, and less Delaunay vertexes are arranged at an area having small curvature.

Meanwhile, the curvature geometry module 2 newly calculates an implicit function value from the arranged Delaunay vertex set. If the curvature geometry module 2 receives only three-dimensional implicit function data as input data, the curvature geometry module 2 calculates an implicit function value by interpolation of the received three-dimensional implicit function data. If the curvature geometry module 2 also receives supplementary data such as particles, the curvature geometry module 2 may perform a more accurate calculation of the implicit function value calculated from the supplementary data instead of the interpolation of the three-dimensional implicit function data.

The space division module 4 performs Delaunay triangulation from the Delaunay vertex set generated from the curvature geometry module 2. The space division module 4 divides the-smallest convex set having vertex sets given by the Delaunay triangulation algorithm into tetrahedrons that are decided by four vertex sets. Although various methods for embodying Delaunay triangulation were introduced, an algorithm having at least one of space division is applied in any case.

The final mesh extraction module 3 generates a final mesh by calculating triangle sets of a curved mesh from the Delaunay triangulation information generated from the space division module 4 and the implicit function data updated at the curvature geometry module 2. The final mesh extraction module 3 uses a tetrahedron adapted isosurface extraction algorithm, which is the modification of standard marching cubes, to generate the final mesh.

Figure 4:
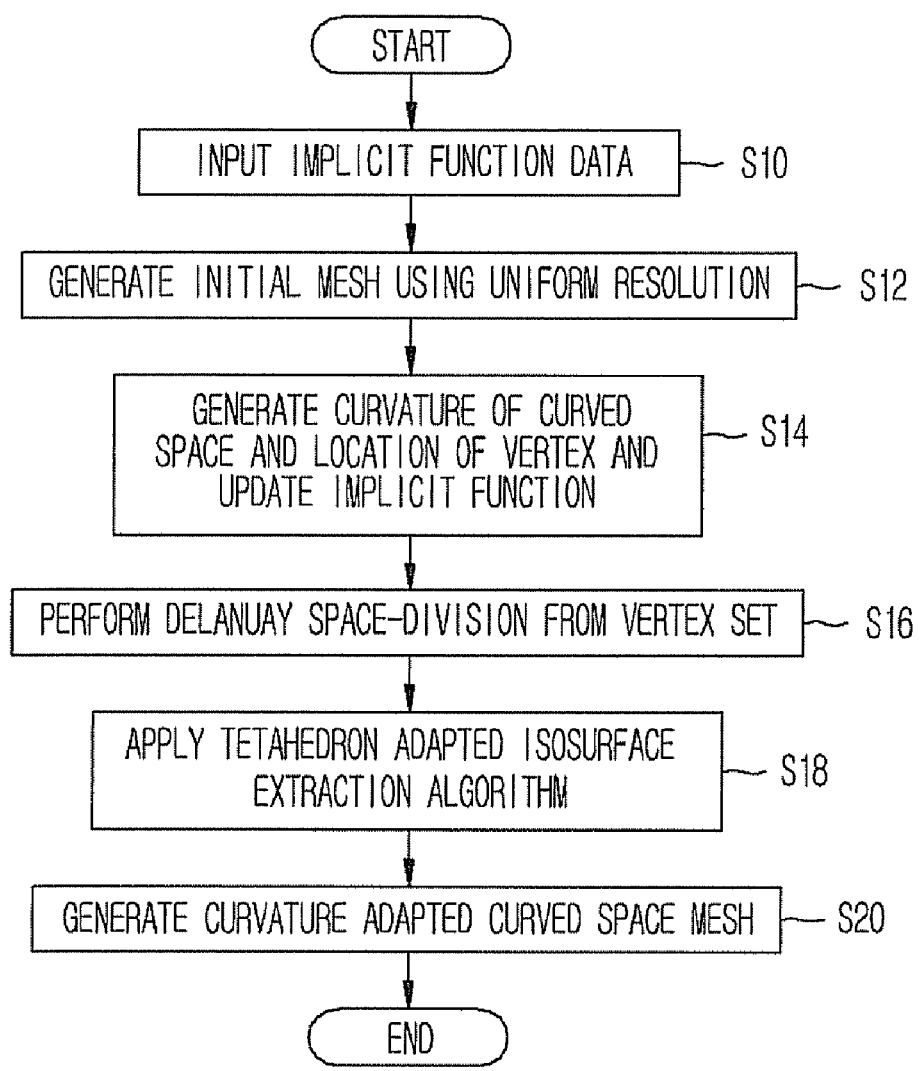
FIG. 4 is a flowchart illustrating a method for generating curvature adapted isosurface from three dimensional implicit function data according to an embodiment of the present invention.

FIG. 4 is a flowchart illustrating a method for generating a curvature adapted isosurface from three dimensional implicit function data according to an embodiment of the present invention.

Referring to FIG. 4, the initial mesh generation module 1 receives the three dimensional implicit function data at step S10.

The initial mesh generation module 1 calculates an initial mesh through middle and low resolution uniform space division based on the three dimensional implicit function data at step S12.

The curvature geometry module 2 receives the calculated initial mesh from the initial mesh generation module 1, calculates a directional curvature of a curved space and a location of a Delaunay vertex set used for Delaunay tetrahedron division, and updates implicit function data for each of the Delaunay vertex sets at step S14.

The curvature geometry module 2 transmits the calculated location of the Delaunay vertex set to the space division module 4. The space division module 4 generates the tetrahedron space division information of the smallest convex space having vertexes through the Delaunay tetrahedron division using the Delaunay vertex set at step S16.

The final mesh extraction module 3 receives the Delaunay triangulation information generated at the space division module 4 and applies a tetrahedron adapted isosurface extraction algorithm, which is the modification of standard marching cubes, on the received Delaunay triangulation information at step S18, thereby generating a curvature adapted curved space mesh at step S20.

It will be apparent to those skilled in the art that various modifications and variations can be made in the present invention. Thus, it is intended that the present invention covers the modifications and variations of this invention provided they come within the scope of the appended claims and their equivalents.

As described above, a system and method for generating a curvature adapted isosurface based on Delaunay triangulation according to the present invention have following effects.

At first, the detailed elements of a curved surface can be efficiently expressed with minimum triangles by generating a mesh based on a curvature of a curved space.

Secondly, a smooth mesh with no cracks can be obtained when a curved space is generated unlike other related methods.

Thirdly, Delaunay vertexes are arranged at a uniform interval using a normal vector from an initial mesh when the Delaunay vertex set is generated, and the number of Delaunay vertexes is controlled by finely classifying edges in consideration of the curvature of a curved space. Therefore, the number of triangles of a final mesh can be optimized by removing unnecessary small and long triangles.

Finally, the system and method for generating a curvature adapted isosurface based on Delaunay triangulation according to the present invention can be used for effectively finding a curvature adapted mesh from the three dimensional implicit function data.

What is claimed is:

1. A system using a processor for generating a curvature adapted isosurface based on Delaunay triangulation comprising:
    an initial mesh generation module for generating an initial mesh by receiving implicit function data;
    a curvature geometry module for receiving the initial mesh from the initial mesh generation module, calculating a directional curvature of a curved surface, generating a Delaunay vertex set used for Delaunay triangulation, and calculating an implicit function value to update the implicit function data for the Delauney vertex set;
    a space division module for generating Delaunay triangulation information by performing Delaunay triangulation based on the generated Delaunay Vertex set from the curvature geometry module; and a final mesh extraction module for receiving the generated Delaunay triangulation information from the space division module and the three-dimensional implicit function data updated at the curvature geometry module, and extracting a final mesh from the received three-dimensional implicit function data.

2. The system of claim 1, wherein after two values are selected between a minimum value and a maximum value of a directional curvature, the Delaunay vertex set is classified into a set having intermediate directional curvatures between the two selected values, a set having directional curvatures smaller than a small value between the two selected values, and a set having directional curvatures larger than a large value between the two selected values.

3. The system of claim 2, wherein in the set having the large directional curvatures, a vertex is arranged at a predetermined distance from a center of an edge formed of two vertices of the initial mesh in a positive direction of a normal vector, and vertices are arranged at a predetermined distance from the two vertices of the edge in a negative direction.

4. The system of claim 2, wherein in the set having the small directional curvatures, a Delaunay vertex is arranged at a predetermined distance from a center of an edge formed of two vertices of the initial mesh in a positive direction or a negative direction of a normal vector, and a Delaunay vertex is arranged at a predetermined distance from a center of an edge that is two edges separated from the edge with the Delaunay vertex arranged in a negative direction or a positive direction of a normal vector.

5. The system of claim 2, wherein in the set having the intermediate directional curvatures, a Delaunay vertex is arranged at a predetermined distance from a center of an edge formed of two vertices of the initial mesh in a positive direction or a negative direction of a normal vector, and a vertex is arranged at a predetermined distance from a center of an adjacent edge in a negative direction or a positive direction.

6. The system of claim 1, wherein the final mesh is generated by applying a tetrahedron adapted isosurface extraction algorithm.

7. A method for generating a curvature adapted isosurface based on Delaunay triangulation performed by a computer system, the method comprising the steps of:
   a) at an initial mesh generation module, generating an initial mesh by receiving three-dimensional implicit function data;
   b) at a curvature geometry module, receiving the initial mesh from the initial mesh generation module, calculating a directional curvature of a curved surface and locations of Delaunay vertex sets, and updating implicit function data for each of the Delaunay vertex sets;
   c) at a space division module, receiving the calculated Delaunay vertex sets transferred from the curvature geometry module, and generating Delaunay triangulation information of a smallest convex space having vertices through Delaunay tetrahedron division algorithm using a Delaunay vertex; and
   d) at a final mesh extraction module, receiving the generated Delaunay triangulation information from the space division module, and generating a curvature adapted curved space mesh by applying a tetrahedron adapted isosurface extraction algorithm on the received Delaunay triangulation information.

* * * * *